US010348521B2

United States Patent
Meulenhoff et al.

(10) Patent No.: US 10,348,521 B2
(45) Date of Patent: Jul. 9, 2019

(54) DISTRIBUTED GATEWAYS

(71) Applicants: Koninklijke KPN N.V., The Hague (NL); Nederlandse Organisatie voor Toegepast-Natuurwetenschappelijk Onderzoek TNO, The Hague (NL)

(72) Inventors: Pieter-Jan Meulenhoff, Noordhorn (NL); Frank Den Hartog, Melba (AU)

(73) Assignees: Koninklijke KPN N.V., Rotterdam (NL); Nederlandse Organisatie voor Toegepast-Natuurwetenschappelijk Onderzoek TNO, The Hague (NL)

( * ) Notice: Subject to any disclaimer, the term of this patent is extended or adjusted under 35 U.S.C. 154(b) by 0 days.

(21) Appl. No.: 15/549,301

(22) PCT Filed: Feb. 8, 2016

(86) PCT No.: PCT/EP2016/052591
§ 371 (c)(1),
(2) Date: Aug. 7, 2017

(87) PCT Pub. No.: WO2016/128339
PCT Pub. Date: Aug. 18, 2016

(65) Prior Publication Data
US 2018/0026813 A1   Jan. 25, 2018

(30) Foreign Application Priority Data
Feb. 9, 2015   (EP) .................... 15154253

(51) Int. Cl.
| | |
|---|---|
| *H04L 12/66* | (2006.01) |
| *H04L 12/24* | (2006.01) |
| *H04L 12/46* | (2006.01) |
| *H04L 12/64* | (2006.01) |

(Continued)

(52) U.S. Cl.
CPC ............ *H04L 12/66* (2013.01); *H04L 12/283* (2013.01); *H04L 12/2803* (2013.01);
(Continued)

(58) Field of Classification Search
CPC ...................................................... H04L 12/66
See application file for complete search history.

(56) References Cited

U.S. PATENT DOCUMENTS

| | | | |
|---|---|---|---|
| 2008/0069121 A1 | 3/2008 | Adamson et al. | |
| 2011/0299543 A1* | 12/2011 | Diab ..................... | G06Q 20/10 370/401 |
| 2013/0166737 A1* | 6/2013 | Christenson ............ | H04L 69/40 709/224 |

FOREIGN PATENT DOCUMENTS

| | | |
|---|---|---|
| EP | 2 782 316 A1 | 9/2014 |
| EP | 2 782 318 A1 | 9/2014 |

OTHER PUBLICATIONS

PCT International Search Report and Written Opinion, PCT International Application No. PCT/EP2016/052591, dated Mar. 16, 2016, 10 pages.

(Continued)

*Primary Examiner* — Kevin M Cunningham
(74) *Attorney, Agent, or Firm* — McDonnell Boehnen Hulbert & Berghoff LLP

(57) ABSTRACT

A system comprises a first network to which at least one user device and a gateway device are connected, which gateway device is also connected to a second network and is configured to cooperate with a virtual gateway application accommodated in the second network. A method of managing the system comprises the step of accommodating an auxiliary virtual gateway application in the at least one user device, which auxiliary virtual gateway application is configured for providing at least some functionalities of the virtual gateway application when communication between the gateway device and the virtual gateway application is lost. Although the virtual gateway application and the auxiliary gateway application may have distinct sets of functionalities, it is preferred that these applications each have DHCP function- (Continued)

ality. This allows the auxiliary virtual gateway application to take over DHCP functions when communication with the second network is lost.

14 Claims, 4 Drawing Sheets

(51) Int. Cl.
  *H04L 29/08* (2006.01)
  *H04L 12/28* (2006.01)
  *H04L 29/12* (2006.01)
(52) U.S. Cl.
  CPC ...... *H04L 12/2825* (2013.01); *H04L 12/4625* (2013.01); *H04L 12/4641* (2013.01); *H04L 12/6418* (2013.01); *H04L 41/0663* (2013.01); *H04L 67/1097* (2013.01); *H04L 61/2015* (2013.01)

(56) References Cited

OTHER PUBLICATIONS

Cruz, Tiago et al., "An Architecture for Virtualized Home Gateway", 2013 IFIP/IEEE International Symposium on Integrated Network Management (IM2013): Mini-Conference, May 27, 2013, pp. 520-526.
The Xen Project, The Powerful Open Source Industry Standard for Virtualization, www.xenproject.org, downloaded Aug. 7, 2017, 5 pages.
VMware Virtualization for Desktop & Server, Application, Public & Hybrid Clouds, www.vmware.com, downloaded Aug. 7, 2017, 2 pages.
Docker—Build, Ship, and Run Any App, Anywhere, www.docker.com, downloaded Aug. 7, 2017, 6 pages.

* cited by examiner

DISTRIBUTED GATEWAYS

CROSS REFERENCE TO RELATED APPLICATIONS

The present application is a national stage entry of, and claims priority to, PCT/EP2016/052591, filed on Feb. 8, 2016, which claims priority to European Patent Application EP 15154253.7, filed in the European Patent Office on Feb. 9, 2015, both of which are hereby incorporated in their entirety herein by reference.

FIELD OF THE INVENTION

The present invention relates to distributed gateways. More in particular, the present invention relates to a method of managing a network connected to a gateway, a gateway system and a gateway device, as well as to a software program product for carrying out said method.

BACKGROUND OF THE INVENTION

Residential gateways, also known as home gateways, are termination devices for connecting consumer networks to a broadband network. Such consumer networks are typically LANs (Local Area Networks) at homes but also at offices or in vehicles. As "residential" gateways are not limited to residential settings, the broader term gateways will be used in this document. A gateway typically couples two network domains which do not share the same domain management, such as an office domain and a public network operator domain.

Over the years, the number of services provided by consumer networks has increased, which has caused an increase in the complexity of gateways. This increased complexity has resulted in increased costs for the network operators who provide the gateways to their customers and are generally responsible for the maintenance of the gateways.

The article by T. Cruz et al., "An Architecture for Virtualized Home Gateways", IFIP/IEEE International Symposium on Integrated Network Management (IM 2013), discloses the concept of virtualizing residential gateways: splitting a gateway into a relatively simple hardware device at the home network and a remote software application at another network, for example the telecommunication operator network. This concept allows the physical device coupled to the consumer network to be much simpler, and hence less expensive, while allowing most software updates to be carried out in the telecommunication operator network, even without involving the hardware device at the consumer's premises.

It is noted that the relatively simple gateway device at the home network mentioned by Cruz may be referred to as a simplified bridge or a bridged residential gateway device.

The concept of a virtualized residential gateway tacitly assumes that the two parts of the residential gateway are permanently, and perfectly, coupled, allowing the two parts to exchange data at all times. However, in practice this is sometimes not the case, as the data link between the physical device and the remote software application may not always be available or even fail for an extended period of time. Also, the remote software application may not always be available, for example due to a server error. As a consequence, the communication between devices in the home or local network may be lost. This limits the practical applications of virtualized residential gateways.

United States Patent Application US 2008/0069121 discloses a residential gateway configured for the virtual gateway model and operable to allow continued operation of target devices if communication with the remote server is interrupted. To allow this, the gateway known from US 2008/0069121 has many additional functions and is therefore much more complicated, and requires more resources, than originally intended in the virtual residential gateway model.

SUMMARY OF THE INVENTION

It is an object of the present invention to solve these and other problems of the prior art by providing a method of managing a network having a virtualized gateway, which method eliminates the need for a permanent faultless connection between the two parts of the virtualized gateway.

Accordingly, the present invention provides a method of managing a first network to which at least one user device and a gateway device are connected, which gateway device is also connected to a second network via a data link and is configured to cooperate with a virtual gateway application accommodated in the second network, the method comprising the step of:

accommodating an auxiliary virtual gateway application in the at least one user device, which auxiliary virtual gateway application is configured for providing at least some functionalities of the virtual gateway application when communication between the gateway device and the virtual gateway application is lost.

By providing an auxiliary virtual gateway application which may be utilized when the data link between the two parts of the regular auxiliary virtualized gateway fails, a link failure is no longer a problem as the gateway device can communicate, via the first or local network, with the auxiliary virtual gateway application. Accordingly, the auxiliary virtual gateway application may take over many tasks of the regular virtual gateway application, leaving the first or local network functioning substantially normally. The present invention therefore provides a significantly increased robustness against failure.

Although the gateway device could be a regular gateway device having all hardware and software resources to carry out all required gateway functions, it is preferred that the gateway device is a "bridged" or simplified gateway device having limited hardware resources as many functions are provided by the remote virtual gateway application. The gateway device can therefore be relatively simple and inexpensive.

By accommodating the auxiliary virtual gateway application in a user device which is already present in the network, additional hardware in the gateway device is avoided. It would of course be possible to provide an additional hardware device in the first or local network, or to provide additional hardware resources in the regular gateway device, but keeping the consumer hardware relatively simple and inexpensive is the rationale for providing a virtualized gateway application, and providing additional hardware goes against this. Instead, hardware resources (in particular memory) of devices already present in the first network are used. Suitable devices for accommodating an auxiliary virtual gateway application are, for example, a NAS (Network Attached Storage) device or a computer, but a modern printer may also have sufficient resources for accommodating and running an auxiliary virtual gateway application. Typically, more than one user device connected to the first or local network will be capable of accommodating the auxiliary virtual gateway application.

It is preferred that the method comprises the further step of:

utilizing the auxiliary virtual gateway application when communication between the gateway device and the virtual gateway application is lost.

That is, when the communication between the cooperating parts of the virtualized gateway fails, for example due to a data link failure or to a remote server error, the auxiliary virtual gateway application accommodated in a user device is utilized, instead of the remote virtual gateway application. Thus the local network may be able to function fully, or at least partially, due to the local auxiliary virtual gateway application. It will be understood that when communication between the gateway device and the virtual gateway application is restored, the auxiliary virtual gateway application is preferably no longer utilized to avoid conflicts between the applications.

The step of accommodating the auxiliary virtual gateway application in a user device may be based on trial and error, offering the application to several devices in succession, if necessary. However, it is preferred that, prior to the step of accommodating an auxiliary virtual gateway application in the at least one user device, the at least one user device is queried whether it is capable of accommodating the auxiliary virtual gateway application. This allows a suitable user device, or more than one suitable user device, to be identified before offering the application to the device or devices. This makes the process of accommodating the auxiliary virtual gateway application in a user device more efficient. This querying step is preferably carried out by the virtual gateway application. If this querying step is carried out by another entity, such as an accommodation application, then it is preferred that the virtual gateway application is notified of the results of the query.

It is possible to carry out the method of the present invention using only a single user device. However, when more than one user device is connected to the first network, it is preferred that the auxiliary virtual gateway application is accommodated in more than one user device. By providing multiple copies of the auxiliary virtual gateway application, the risk of failure is even further reduced.

The auxiliary virtual gateway application may be accommodated in one or more user devices in various ways. For example, the gateway device may store the application and load it into a suitable user device. However, this requires additional resources (such as additional memory) in the gateway device, which was to be avoided. It is therefore preferred that the method of the present invention further comprises the step of accommodating an activation application in the gateway device, which activation application is configured for activating the auxiliary virtual gateway application when communication between the gateway device and the virtual gateway application is lost, for example because a failure of the data link between the first and the second network occurs or because the remote virtual gateway application is no longer available. By providing an activation application in the gateway device, for activating the auxiliary virtual gateway application in one (or more) of the user devices, a very efficient arrangement is achieved, as the activation application can be relatively small and simple, but is arranged for activating the relatively large and complex auxiliary virtual gateway application in another device. By being located in the gateway device, the activation application can quickly determine whether the data link, and hence the communication with the remote server, is still active. In some embodiments, the activation application may actively monitor the data link between the gateway device and the second network, while in other applications the activation application is notified by another application, for example by an application native to the gateway device, if communication between the gateway device and the virtual gateway application is interrupted. The activation application may be accommodated in the gateway device by the virtual gateway application.

In an advantageous embodiment, the (regular) virtual gateway application and the auxiliary virtual gateway application have different but overlapping sets of functionalities. That is, functionalities of the auxiliary virtual gateway application and the (regular) virtual gateway application need not all be the same. It is preferred that the auxiliary virtual gateway application has a limited set of functionalities, but that this set includes all functionalities required to keep the local network operable. Possible functions (or functionalities) are: a PBX (local exchange) application that informs the user that there is a network problem and that communication is interrupted, possibly providing assistance information; an http (hypertext transfer protocol) server application that answers all outgoing http requests and informs the user that communication is interrupted, possibly providing assistance information; a network diagnostics application which may be combined with one of the previous applications.

It is further preferred that the virtual gateway application and the auxiliary gateway application each have DHCP functionality. It is well known that DCHP (=Dynamic Host Configuration Protocol) is a protocol for dynamically distributing network configuration parameters, such as IP addresses for services, interfaces and user devices. The DCHP functionality is required when for example a wireless device (such as a printer) wants to connect to the local network. By providing this functionality in the auxiliary virtual gateway application, user devices can connect to the local network, also when the data link fails.

The present invention further provides a software program product containing processor instructions for causing a processor to carry out the method steps described above. The software program product comprise a tangible carrier, such as a DVD or a USB stick, and may therefore be non-transitory. Alternatively, the software program product may be stored on a server from which it may be downloaded using the Internet. The software program product contains software instructions which can be carried out by the processor of a device, such as a server, a user device (for example a smartphone), and/or a monitoring device.

The present invention still further provides a gateway device configured for cooperating with a remote virtual gateway application and further configured for accommodating an activation application, which activation application is configured for activating an auxiliary virtual gateway application when communication between the gateway device and the virtual gateway application is lost.

The present invention yet further provides a user device, such as a computer or a printer, which is configured for accommodating an auxiliary virtual gateway application. The user device is preferably also configured for running the auxiliary virtual gateway application when this application is activated.

The present invention additionally provides a network system comprising a first network to which at least one user device and a gateway device are connected, which gateway device is also connected to a second network and is configured to cooperate with a virtual gateway application accommodated in the second network, the system being configured for:

accommodating an auxiliary virtual gateway application in the at least one user device, which auxiliary virtual gateway application is configured for providing at least some functionalities of the virtual gateway application when communication between the gateway device and the virtual gateway application is lost.

The network system is preferably also configured for:

utilizing the auxiliary virtual gateway application when communication between the gateway device and the virtual gateway application is lost.

In such a network system, the virtual gateway application and the auxiliary virtual gateway application may have different but overlapping sets of functionalities, for example each may have DHCP functionality while they may not share all other functionalities.

BRIEF DESCRIPTION OF THE DRAWINGS

The present invention will further be explained with reference to exemplary embodiments illustrated in the drawings, in which.

DETAILED DESCRIPTION OF EXEMPLARY EMBODIMENTS

Figure 1:
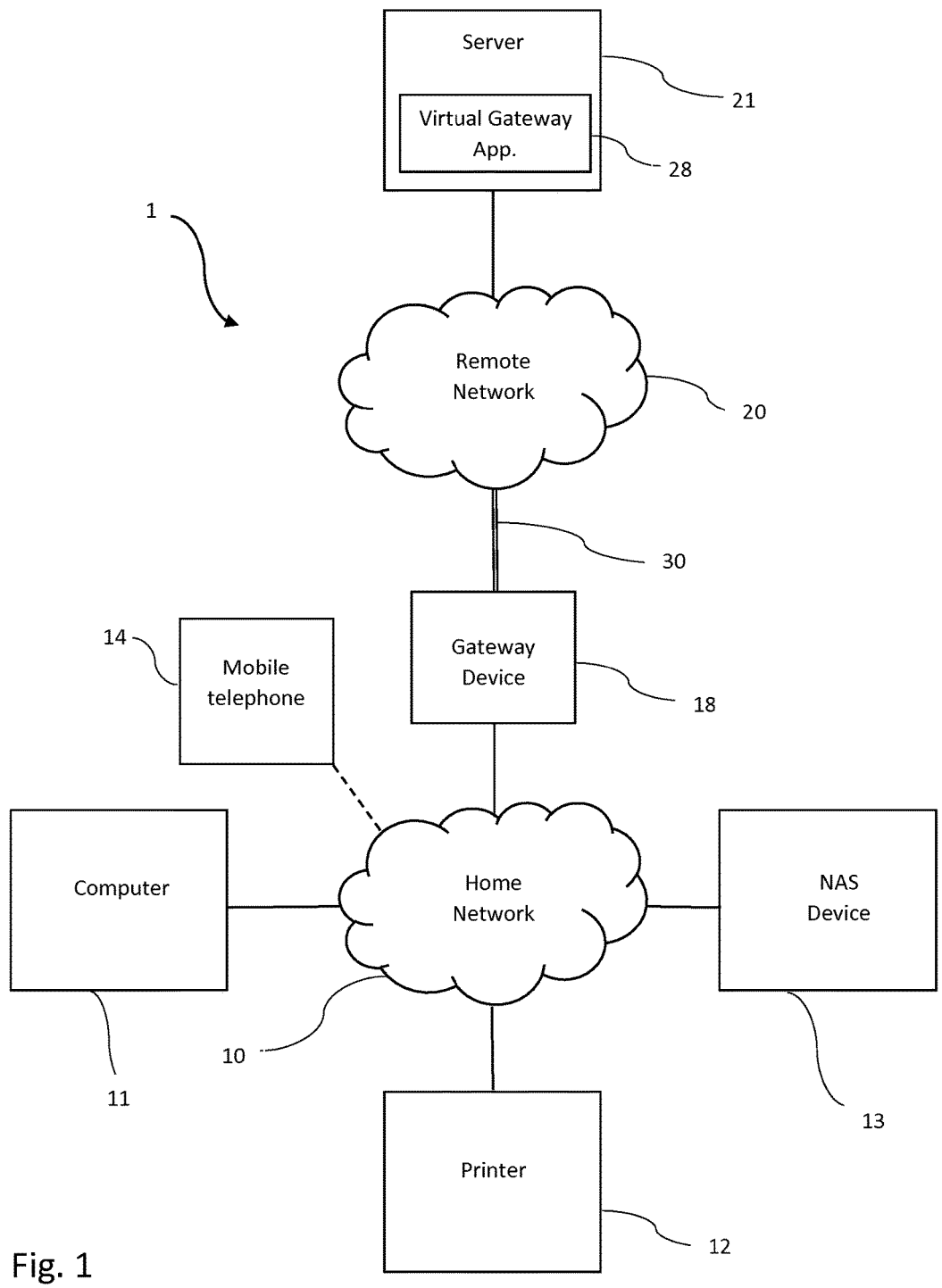
FIG. 1 schematically shows a telecommunication networks system coupled via a virtualized gateway according to the prior art.

The telecommunication networks system 1 according to the prior art which is schematically illustrated in FIG. 1 comprises a first or local network 10 and a second or remote network 20. Several user devices are connected to the local network 10, such as a computer 11, a printer 12, a NAS (Network Attached Storage) device 13 and a mobile (cellular) telephone or smartphone 14. Of course, the number of user devices is not limited to four, as shown merely by way of illustration in FIG. 1, and the number of user devices may be greater or smaller than four. For example, several computers may be connected to the local network 10. The connections between the local network 10 and the user devices 11-14 may be physical connections using cables and/or wireless connections using Wi-Fi, for example. The mobile telephone 14 may be connected with the local network 10 by using Bluetooth®, for example. The local network may be a network at a home, office or company.

A gateway device 18 is also connected to the local network 10 and facilitates the exchange of data between the local network 10 and the remote network 20. The gateway device 18 may be connected to a (remote) server 21 via a logical subscriber link (LSL) comprising a data link 30 and the remote network 20. The logical subscriber link may be constituted by, for example, a DSL (Digital Subscriber Line) network, a cable network, a mobile network (e.g. 3G or 4G), an optical fibre network, an Ethernet network, a Wi-Fi network, or another access network. Other devices (not shown) may be connected to the second or remote network 20.

In accordance with the NERG (Network Enhanced Residential Gateway) model, also known as virtualized gateway model, part of the functionality of the gateway device 18 is provided by a virtual gateway application 28, which is accommodated in the server 21. The virtual gateway application 28 may be a software program (that is, a software application) which provides certain gateway functions, such as NAT (Network Address Translation), firewall function, routing, DHCP (Dynamic Host Configuration Protocol) and DNS (Domain Name System), for example, as well as application layer services such as web service, home automation, storage, PBX telephony, etc. As most of the gateway functions are provided by the virtual gateway application, the gateway device 18 can be relatively simple. This allows the gateway device 18 to be relatively inexpensive. In addition, by accommodating the virtual gateway application in a server, maintenance of the gateway functions is made easier and less expensive. It will be understood that the server 21 which accommodates the virtual gateway application 28 may accommodate more than one virtual gateway application, and may be operated by a telecommunications provider. In general, the local network 10 and the remote network 20 (and server 21) will be operated and controlled by different entities, although this is not essential.

The prior art arrangement of FIG. 1 has the disadvantage that the proper functioning of the gateway device 18 entirely depends on the proper communication between the gateway device 18 and the virtual gateway application 28, which in turn depends on the availability of the data connection between the device 18 and the server 21. If this connection fails, for example due to a fault in the data link 30 or in the remote network 20, or if the virtual gateway application 28 fails, then the gateway device 18 is no longer capable of carrying out most of its functions. When, for example, a new user device is to be connected to the local network 10, or when an existing user device needs to renew its connection with the local network, the user device will require an IP (Internet Protocol) address. In a "classical" arrangement (in which a non-virtualized gateway is used), such an address is provided by the DHCP function of the gateway device, but in the arrangement of FIG. 1 the address will be provided by the DHCP function of the virtual gateway application 28 in the remote server 21. If an interruption occurs in the data link 30, for example, the gateway device 18 will no longer be capable of providing IP addresses. It will be clear that this is an undesired consequence of the NERG model.

Figure 2:
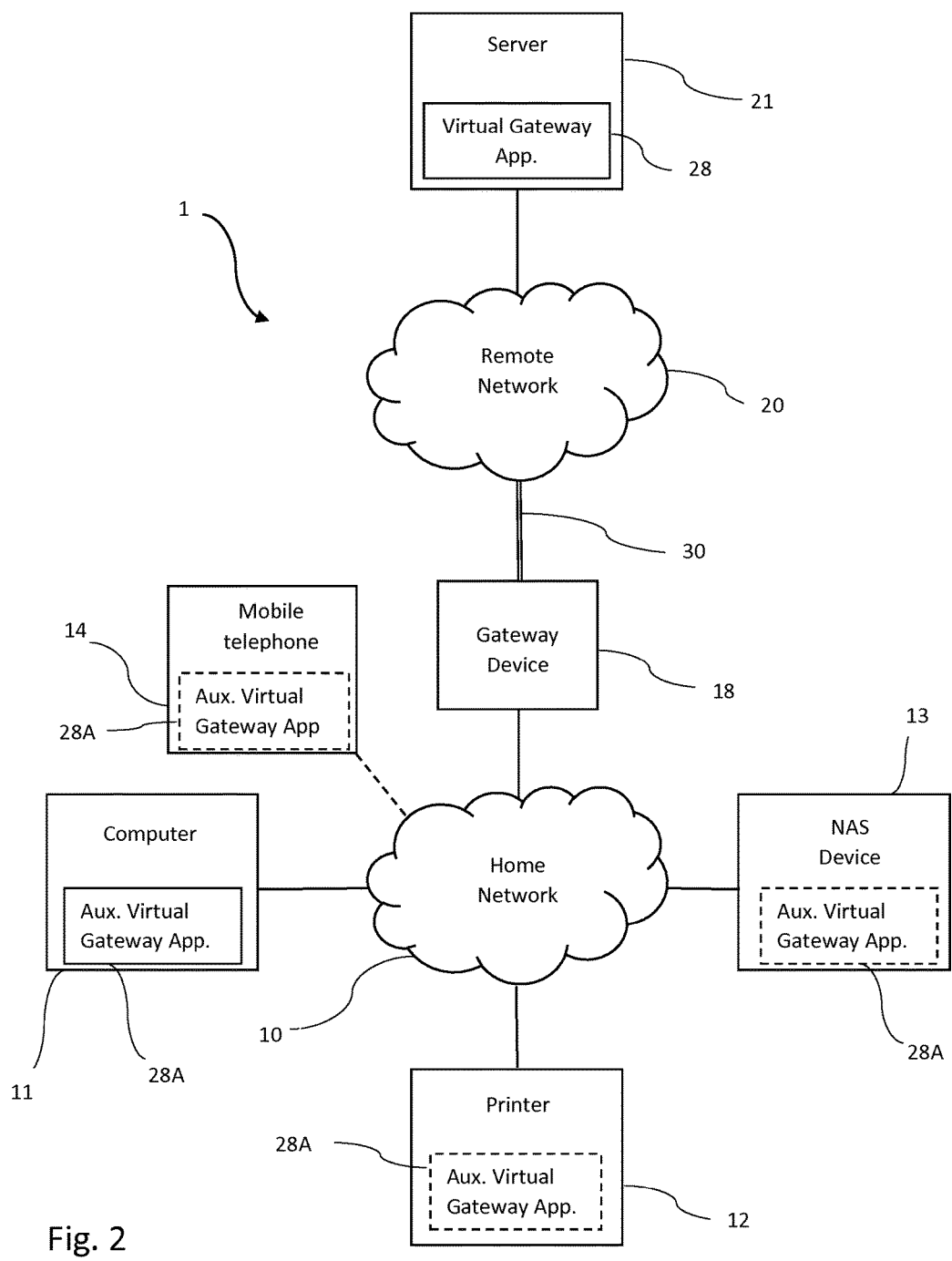
FIG. 2 schematically shows a telecommunication networks system coupled via a virtualized gateway according to an embodiment of the present invention.

An arrangement according to the present invention, in which this problem is solved, is schematically illustrated in FIG. 2. The telecommunication networks system 1 schematically illustrated in FIG. 2 also comprises a first or local network 10, to which several user devices 11-14 are connected, and a second or remote network 20, to which a server 21 is connected. The first network 10 and the second network 20 are also connected by a data link 30, as in FIG. 1, while the server 21 hosts a virtual (residential) gateway application 28.

In contrast to the system of FIG. 1, the system according to the invention comprises at least one auxiliary virtual gateway application (AVGA) 28A which is accommodated in one of the user devices connected to the local network 10. In the example shown in FIG. 2, the auxiliary virtual gateway application 28A is accommodated in the computer 11, but may additionally, or alternatively, be accommodated in the printer 12, the NAS device 13 and/or in the mobile (cellular) telephone (smartphone) 14. The auxiliary virtual gateway application 28A comprises gateway functions (such as providing IP addresses and routing traffic) which are traditionally provided by the gateway device itself and are in the NERG model provided by the remote virtual gateway application (28 in FIG. 2). Although the auxiliary virtual gateway application 28A may be constituted by a hardware unit which may be inserted or otherwise accommodated in a user device, it is preferred that the auxiliary virtual gateway application 28A is a software component, such as a software program (application), a script, a virtual machine image and/or a configuration file.

By providing an auxiliary virtual gateway application 28A in at least one user device, at least part of the functionality of the gateway device 18 is no longer dependent on the communication with the remote server 21, at least not for the functions provided by the auxiliary virtual gateway application 28A. By providing a local auxiliary virtual gateway application 28A, the reliability of the system is improved.

It is noted that the server 21 hosting the virtual gateway application 28 and which is shown as a remote server may be a server in an access network (in which case the logical subscriber link may be only a data link without a remote network). Alternatively, or additionally, the virtual gateway application 28 may be accommodated in the cloud or in a broadband network gateway. In some scenarios, losing the communication between the gateway device 18 and the virtual gateway application 28 will involve a failure in the data link 30, while in other scenarios it will involve other failures, such as server failures or failures of the second network 20.

It is further noted that in accordance with the present invention the auxiliary virtual gateway application 28A is not provided in the gateway device 18 but in a user device 11-14. In this way, the complexity of the gateway device 18 is not increased (apart from an optional and simple activation function, which will later be explained) and no additional resources, such as memory units, are required. Use is advantageously made of resources in the user devices, such as a processor and memory. Accommodating any virtual gateway application in the gateway device 18 would in fact be contrary to the NERG model, as the purpose of the NERG model is to simplify the gateway device.

It is preferred that the auxiliary virtual gateway application 28A is loaded into a user device so as to be available when needed, but is only activated when the communication with the virtual gateway application 28 fails. That is, the auxiliary virtual gateway application 28A is preferably only active when the virtual gateway application 28 cannot be used by the gateway device 18 of the local network 10. It would be possible to let the virtual gateway application 28 and the auxiliary virtual gateway application 28A be active simultaneously, but that could lead to conflicts of priority and would certainly lead to increased data traffic in the first or local network 10. Conversely, it would be possible to abolish the virtual gateway application 28 in the remote server 21 and to only use the auxiliary virtual gateway application(s) 28A in the user device(s). However, this solution, although feasible, would require a relatively large amount of resources from the user devices, as they would have to be able to provide all functionalities of the virtual gateway application 28. In addition, by moving the virtual gateway back to the local network environment, part of the advantages of the NERG model is lost, in particularly the serviceability of the virtual gateway application.

In order to accommodate the auxiliary virtual gateway application 28A in a user device, the present invention preferably utilizes an accommodation application which may itself be accommodated in the gateway device, preferably temporarily, but may be supplied by the virtual gateway application 28. The accommodation application is a software program configured for accommodating an auxiliary virtual gateway application in a user device. The accommodation application may be relatively simple and may be deleted from the gateway device, so as to free resources, when the auxiliary virtual gateway application 28A has been accommodated in all available user devices of the local network 10.

It is noted that accommodating a software application in a device, as used here, implies at least storing the application in a device, but preferably also installing, that is, making the application ready for use. Software applications which have been accommodated in a device typically have to be activated to start running. The auxiliary virtual gateway applications of the present invention are preferably activated by an activation application, which is preferably distinct from the accommodation application and may be accommodated in the gateway device 18. The activation application may activate an auxiliary virtual gateway application accommodated in a user device upon detection of a loss of communication between the gateway device (18 in FIG. 2) and the (remote) virtual gateway application (28 in FIG. 2).

It is also possible to accommodate an auxiliary virtual gateway application in a user device by using a mobile (that is, cellular) telephone. In such an embodiment, the virtual gateway application 28 could, upon detection of a communication problem, transmit a suitable accommodation application to mobile telephone of a system administrator (or user) of the local network 10 via a mobile telephone network. This accommodation application could then, using for example Bluetooth® (or a portable memory device, such as a USB stick), accommodate an auxiliary virtual gateway application in a user device, and possibly also an activation application in the gateway device 18.

Although it is only required to accommodate the auxiliary virtual gateway application (AVGA) in a single user device (e.g. computer 11 in FIG. 2), it is also possible to accommodate the auxiliary virtual gateway application in two or more user devices. This offers the advantage of greater reliability in case a user device breaks down or is (accidentally or on purpose) switched off. When multiple copies of the auxiliary virtual gateway application are provided in the local network, it is preferred to assign a priority ranking to the various copies in order to avoid any conflicts. Although the multiple copies of the auxiliary virtual gateway application may be identical, embodiments can be envisaged in which different user devices accommodate different versions of the auxiliary virtual gateway application, the different versions being adapted to the particular user device (e.g. adapted to the particular processor, operating system, I/O system and/or memory size).

The auxiliary virtual gateway application 28A may have the same functionalities as the virtual gateway application 28, but this is not required. In a preferred embodiment, the auxiliary virtual gateway application 28A has a smaller number of functionalities than the virtual gateway application 28. Conversely, the auxiliary virtual gateway application 28A may have functionalities which the virtual gateway application does not have, such as a troubleshooting function. In general, it is desired that the auxiliary virtual gateway application has a DHCP function or equivalent function capable of providing IP addresses to user devices.

Figure 3:
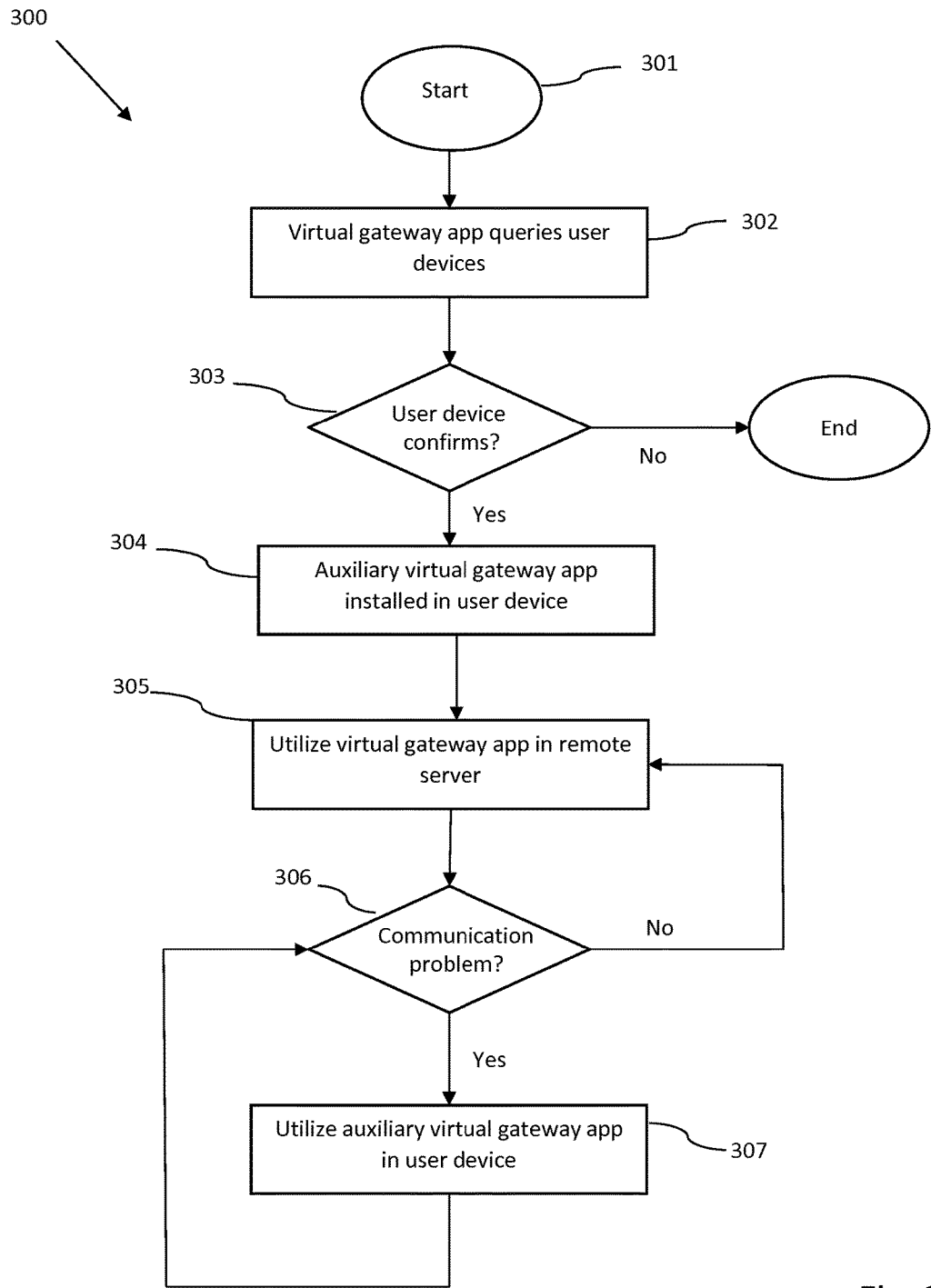
FIG. 3 schematically shows an embodiment of a method of managing a network according to the present invention.

An embodiment of a method of managing a network according to the present invention is schematically illustrated in FIG. 3. The method 300 illustrated in FIG. 3 starts in step 301, which step may include initialisations. In step 302, the virtual gateway application (28 in FIG. 2) remotely queries the user devices of the local network whether they are capable of accommodating an auxiliary virtual gateway application. This may be done using the UPnP (Universal Plug and Play) network protocol, using another local control protocol, or by manual configuration. In step 303, the virtual gateway application determines whether at least one user device has confirmed, that is, replied positively, within a certain time period. If there is no positive confirmation after this time period, the method ends in step 310 and no auxiliary virtual gateway application is accommodated in a user device. In some embodiment, the virtual gateway application may repeatedly query the user devices until at least one has replied positively.

In step 304, the auxiliary virtual gateway application is installed in the user device or devices which positively replied to the query. In step 305, the regular operation mode is used: utilizing the virtual gateway application in the remote server. In step 306 it is determined whether there is a data link failure or other loss of communication. If this is not the case, the method continues with the regular operation of step 305. However, if it is the case and a data link failure or other type of communication loss has occurred, then the method continues with step 307 in which the auxiliary virtual gateway application in the user device is activated and used. While using the auxiliary virtual gateway application, the method returns to step 306 to determine whether the data link failure or other communication loss is still present.

It is noted that in the method of the present invention, use can advantageously be made of the Docker open platform (see www.docker.com). Docker is a generic platform and may be used for the query of the user devices, for installing the virtual gateway application(s), and/or for installing the virtual gateway application(s). Other software platforms that may advantageously be used are Xen (www.xenproject.org), a hypervisor or virtual machine monitor (VMM), and platforms provided by VMware (www.vmware.com), for example.

Figure 4:
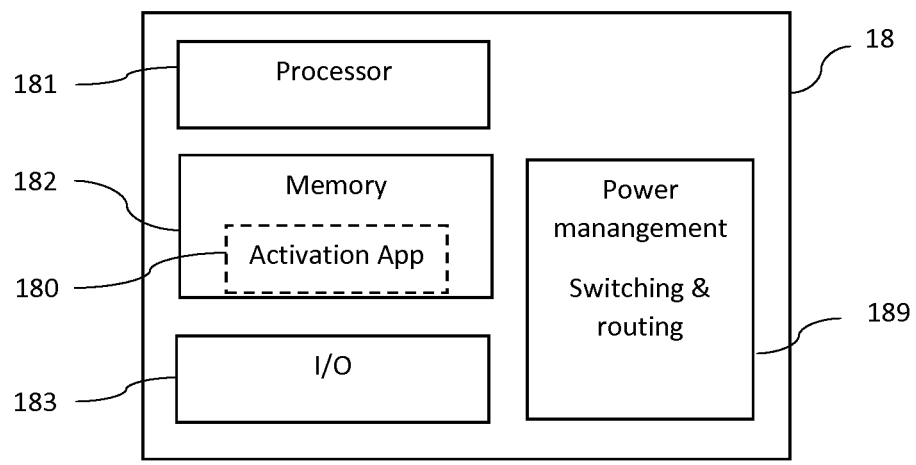
FIG. 4 schematically shows a gateway device configured for use in an embodiment of the present invention.

An exemplary embodiment of a gateway device configured for use in an embodiment of the present invention is schematically illustrated in FIG. 4. The gateway device 18 is shown to comprise a processor 181, a memory 182, an input/output (I/O) unit 183 and a further unit 189. The further unit 189 may be a power management unit, a switching and routing unit, etc. More than one further unit may be present.

The memory 182 may be used for storing an activation application which may, when triggered by a data link failure, be executed by the processor and activate the auxiliary virtual gateway application in a user device. The size of the activation application will typically be limited. It can thus be seen that the complexity of the gateway device 18 is substantially unaltered by the present invention.

A software program product for carrying out an embodiment of the method according to the present invention may comprises a tangible carrier, such as a DVD or a memory stick, on which a software program is stored. The software program comprises instructions for causing a processor to carry out the method steps described above. Although the software program product preferably is a tangible product, it may also be a non-tangible product, for example a software program which can be downloaded via the Internet.

Figure 5:
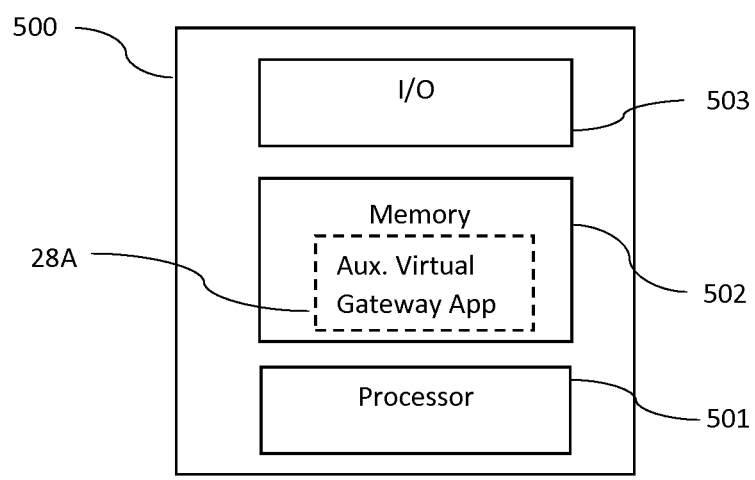
FIG. 5 schematically shows a user device for carrying out an embodiment of the method according to the present invention.

A user device configured for accommodating an auxiliary virtual gateway application is schematically illustrated in FIG. 5. The user device 500, which may be a NAS (network-attached storage) device or a printer, for example, comprises a processor 501, a memory 502, and an I/O unit 503. Via the I/O unit 503, an auxiliary virtual gateway application 28A may be accommodated in the memory 502, under control of the processor 501. When activated, the auxiliary virtual gateway application may run on (that is, be executed by) the processor 501, using the memory 502. This allows the user device to provide gateway functionalities normally provided by the (remote) virtual gateway application. It will be understood that the auxiliary virtual gateway application is configured for cooperating with the gateway device (18 in FIG. 2).

The present invention is based upon the insight that a communication failure between the gateway device and the remote virtual gateway application may disrupt the proper functioning of a local network. The present invention benefits from the further insights that this situation may be remedied by moving at least part of the functions of the virtual gateway application to the local network, but not to the gateway device, and that present-day user devices are typically capable of accommodating and running software applications.

It will be understood that the description of the invention given above is not intended to limit the invention in any way. Singular nouns and the articles "a" and "an" are of course not meant to exclude the possibility of plurals. Devices mentioned in this document, such as mobile telephones or smartphones, may be replaced with their successors, even if these successors are not yet known at the time of writing. The abstract should never be used to limit the scope of the claims, and neither should reference numbers in the claims.

It will further be understood by those skilled in the art that the present invention is not limited to the embodiments mentioned above and that many additions and modifications are possible without departing for the scope of the invention as defined in the appending claims.

The invention claimed is:

1. A method of managing a first network to which at least one user device and a gateway device are connected, wherein the gateway device is also connected to a second network and is configured to communicatively cooperate with a virtual gateway application in a server device in the second network, and wherein particular gateway functionalities are carried out by the virtual gateway application instead of by the gateway device, the method comprising:

at the server device, the virtual gateway application communicating with the at least one user device via the gateway device to determine that the at least one user device is capable of accommodating an auxiliary virtual gateway application; and accommodating the auxiliary virtual gateway application in the at least one user device, wherein accommodating the auxiliary virtual gateway application in the at least one user device comprises:

receiving software comprising the auxiliary virtual gateway application at an input/output unit of the at least one user device; and installing the software in the at least one user device to put the auxiliary virtual gateway application in a state that is ready to be activated for execution in the at least one user device, wherein the auxiliary virtual gateway application is configured for providing at least some of the particular gateway functionalities of the virtual gateway application when the auxiliary virtual gateway application is activated in response to communication between the gateway device and the virtual gateway application being lost.

2. The method according to claim 1, further comprising: utilizing the auxiliary virtual gateway application when communication between the gateway device and the virtual gateway application is lost.

3. The method according to claim 1, wherein communicating with the at least one user device via the gateway device to determine that the at least one user device is capable of accommodating an auxiliary virtual gateway application comprises the virtual gateway application querying the at least one user device to determine whether the at least one user device is capable of accommodating the auxiliary virtual gateway application.

4. The method according to claim 1, wherein more than one user device is connected to the first network and wherein the method further comprises accommodating an auxiliary virtual gateway application in more than one user device.

5. The method according to claim 1, further comprising accommodating an activation application in the gateway device, wherein the activation application is configured for activating the auxiliary virtual gateway application when communication between the gateway device and the virtual gateway application is lost.

6. The method according to claim 1, wherein the virtual gateway application and the auxiliary virtual gateway application have different but overlapping sets of gateway functionalities.

7. The method according to claim 1, wherein the virtual gateway application and the auxiliary virtual gateway application each have DHCP functionality.

8. A non-transitory computer-readable medium having instructions stored thereon that, when executed by one or more processors, cause the one or more processors to carry out operations including:
querying at least one user device connected to a first network from a virtual gateway application executing in a server device in a second network to determine that the at least one user device is capable of accommodating an auxiliary virtual gateway application;
accommodating the auxiliary virtual gateway application in at least one user device, wherein accommodating the auxiliary virtual gateway application in the at least one user device comprises:
receiving software comprising the auxiliary virtual gateway application at an input/output unit of the at least one user device; and
installing the software in the at least one user device to put the auxiliary virtual gateway application in a state that is ready to be activated for execution in the at least one user device,
wherein the first network and the second network are connected via a gateway device,
wherein the gateway device is is configured to communicatively cooperate with a virtual gateway application accommodated in the second network,
wherein particular gateway functionalities are carried out by the virtual gateway application instead of by the gateway device,
and wherein the auxiliary virtual gateway application is configured for providing at least some of the particular gateway functionalities of the virtual gateway application when the auxiliary virtual gateway application is activated in response to communication between the gateway device and the virtual gateway application being lost.

9. A gateway device comprising:
one or more processors;
a first communicative connection to a user device in a first network;
a second communicative connection to a server device in a second network;
memory; and
instructions stored in the memory that when executed by the one or more processors cause the gateway device to carry out operations including:
cooperating with a remote virtual gateway application in the server device by way of the second communicative connection, wherein particular gateway functionalities are carried out by the remote virtual gateway application instead of by the gateway device; and
accommodating an activation application, wherein accommodating the activation application comprises:
receiving software comprising the activation application from the remote virtual gateway application; and
installing the software to put the activation application in a state that is ready to be activated for execution,
wherein the activation application is configured for activating an auxiliary virtual gateway application accommodated in the user device and configured for providing at least some of the particular gateway functionalities of the remote virtual gateway application in response to the gateway device loosing communication with the remote virtual gateway application.

10. A network system comprising:
a first network to which at least one user device is connected;
a gateway device connected to the first network and to a second network, the gateway device being configured to communicatively cooperate with a virtual gateway application in a server device in the second network, wherein particular gateway functionalities are carried out by the virtual gateway application instead of by the gateway device;
one or more processors; and
memory storing instructions that when executed by the one or more processors cause the one or more processors to carry out operations including:
at the server device, the virtual gateway application communicating with the at least one user device via the gateway device to determine that the at least one user device is capable of accommodating an auxiliary virtual gateway application;
accommodating the auxiliary virtual gateway application in the at least one user device, wherein accommodating the auxiliary virtual gateway application in the at least one user device comprises:
receiving software comprising the auxiliary virtual gateway application at an input/output unit of the at least one user device; and
installing the software in the at least one user device to put the auxiliary virtual gateway application in a state that is ready to be activated for execution in the at least one user device,
wherein the auxiliary virtual gateway application is configured for providing at least some of the particular gateway functionalities of the virtual gateway application when the auxiliary virtual gateway application is activated in response to communication between the gateway device and the virtual gateway application being lost.

11. The network system according to claim 10, wherein the operations further include:
utilizing the auxiliary virtual gateway application when communication between the gateway device and the virtual gateway application is lost.

12. The network system according to claim 10, wherein the virtual gateway application and the auxiliary gateway application have distinct sets of functionalities.

13. The network system according to claim 10, wherein the virtual gateway application and the auxiliary gateway application each have DHCP functionality.

14. A user device configured for use in a network provided with a gateway device, the user device comprising:
one or more processors;
a communicative connection, via the gateway device, to a virtual gateway application in a remote network, wherein particular gateway functionalities are carried out by the virtual gateway application instead of by the gateway device;
an input/output (I/O) unit;
memory; and
instructions stored in the memory that when executed by the one or more processors cause the user device to carry out operations including:
receiving at the I/O unit software comprising an auxiliary virtual gateway application configured for providing at least some of the particular gateway functionalities of the virtual gateway application when communication between the gateway device and the virtual gateway application is lost;
accommodating the auxiliary virtual gateway application, wherein accommodating the auxiliary virtual gateway application comprises installing the software in the at least one user device to put the auxiliary virtual gateway application in a state that is ready to be activated for execution in the at least one user device; and
running the auxiliary virtual gateway application upon activation by the gateway device.

* * * * *